United States Patent

Richards et al.

[11] Patent Number: 5,922,804
[45] Date of Patent: Jul. 13, 1999

[54] METHOD FOR REDUCING VOLATILE ORGANIC CONTENT OF COATING COMPOSITIONS

[75] Inventors: Bradley M. Richards, Maumee; Sudhakar Dantiki, Toledo, both of Ohio

[73] Assignee: BASF Corporation, Southfield, Mich.

[21] Appl. No.: 08/672,800

[22] Filed: Jun. 28, 1996

[51] Int. Cl.[6] ............ C08L 75/02; C08L 75/04; C08G 18/10
[52] U.S. Cl. .......... 524/589; 524/592; 524/874; 524/871; 528/53; 528/59
[58] Field of Search .......... 528/53, 59; 524/589, 524/592, 874

[56] References Cited

U.S. PATENT DOCUMENTS

| | | | |
|---|---|---|---|
| 4,137,276 | 1/1979 | Sirota | 528/59 |
| 4,419,513 | 12/1983 | Breidenbach et al. | |
| 5,214,086 | 5/1993 | Moemile et al. | |
| 5,523,376 | 6/1996 | Hicks et al. | 524/589 |
| 5,661,216 | 8/1997 | Laginess et al. | 524/874 |

*Primary Examiner*—Tae Yoon
*Attorney, Agent, or Firm*—Anne Gerry Sabourin

[57] ABSTRACT

A method for reducing the volatile organic content of coating compositions wherein first, the ketimine of acetone is formed by reacting acetone and a ketimine having the formula

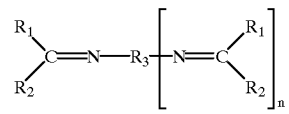

wherein n is 1 to 4, $R_1$ and $R_2$ may be alkyl aryl, cycloaliphatic or substituted alkyl, aryl, or cycloaliphatic group. $R_1$ and $R_2$ may be the same or different, with the proviso that $R_1$ and $R_2$ are not both $CH_3$. $R_3$ is an aliphatic, aromatic arylaliphatic or cycloaliphatic group, which may also contain O, N, S or Si. The ketimine of acetone is subsequently reacted with at least one isocyanate functional crosslinking resin.

7 Claims, No Drawings

METHOD FOR REDUCING VOLATILE ORGANIC CONTENT OF COATING COMPOSITIONS

BACKGROUND OF THE INVENTION

The present invention relates to a method for reducing the volatile organic content of coating compositions. More specifically the invention relates to the use of the ketimine of acetone in coating compositions.

BACKGROUND OF THE RELATED ART

Acetone is well known as a solvent for coating compositions. Recent environmental regulations have provided that acetone is no longer a volatile organic compound that contributes to ozone in the lower atmosphere, due to low photochemical activity. (60 Fed. Reg. 31633). Accordingly, acetone is no longer included in the calculation of VOC of materials such as paints and coatings. The only other zero VOC solvent for coatings is water. Accordingly, it is desirable that acetone be used as a solvent whenever possible, or that acetone be a by-product of reactions in coating compositions.

The prior art discloses that ketimines can be reacted with atmospheric moisture to form a ketone and polyamine, followed by the reaction of polyamine and polyisocyanate to form a urea. See Block and Halpaap, 59 Journal of Coatings Technology 131–5, 1987. Certain problems, however, are encountered in the use of the ketimine of acetone for this reaction, since ketimine production requires the removal of water and acetone is very hygroscopic. In addition the distillation of water from acetone is very difficult due to the low vapor pressure of acetone.

The present invention is directed to a method for lowering the VOC content of coating compositions by forming and utilizing the ketimine of acetone in a film forming coating composition.

SUMMARY OF THE INVENTION

The present invention is a method for reducing the volatile organic content of coating compositions comprising the steps of first forming the ketimine of acetone by reacting
i) acetone, and
ii) a ketimine having the formula

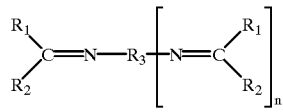

wherein n is 1 to 4,
$R_1$ is alkyl, aryl, cycloaliphatic or substituted alkyl, aryl, or cycloaliphatic group,
$R_2$ is alkyl aryl, cycloaliphatic or substituted alkyl, aryl, or cycloaliphatic group, with the proviso that both $R_1$ and $R_2$ are not both $CH_3$, and $R_3$ is aliphatic, aromatic arylaliphatic or cycloaliphatic group which may also contain O, N, S or Si. The ketimine of acetone is subsequently reacted with at least one isocyante functional crosslinking resin, to form a coating composition.

DETAILED DESCRIPTION OF THE INVENTION

The present invention is a method for reducing the volatile organic content of a coating composition, by forming and utilizing the ketimine of acetone in the coating composition. The method comprises the steps of combining ketimine and excess acetone to form the ketimine of acetone. The ketimine of acetone is then combined with isocyanate, wherein the ketimine and isocyanate undergo a crosslinking reaction. Alternatively, the ketimine of acetone may be formed by reacting a ketimine with excess acetone, and allowing the reactants to stand at ambient conditions. During this time a "trans-ketonization" reaction occurs, in that the ketimine of acetone is formed in place of the original ketimine. For purposes of the present invention, the ketimine is selected from the group consisting of compounds having the formula

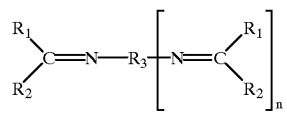

wherein n is 1 to 4, $R_1$ and $R_2$ are alkyl, aryl, cycloaliphatic or substituted alkyl, aryl, or cycloaliphatic group. $R_1$ and $R_2$ may be the same or different, with the proviso that $R_1$ and $R_2$ are not both $CH_3$.

$R_3$ is an aliphatic, aromatic arylaliphatic or cycloaliphatic group which may also contain O, N, S or Si.

The preferred ketimines are diketimines obtained from the reaction between a diamine and a ketone. The amines preferred for this reaction correspond to the formula $H_2N$—R—$NH_2$, wherein R is aliphatic, aromatic, cycloaliphatic or arylaliphatic, having a carbon chain length between C2 and C18, which may be saturated or unsaturated. The amine may also include O, S, or N. Suitable amines include ethylene diamine, ethylene glycol diamine, propylene glycol diamine, cycloaliphatic diamines. Preferred cycloaliphatic diamines include compounds having the following structures:

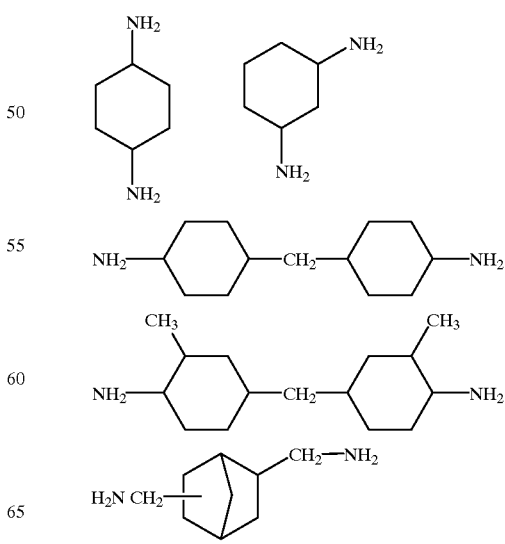

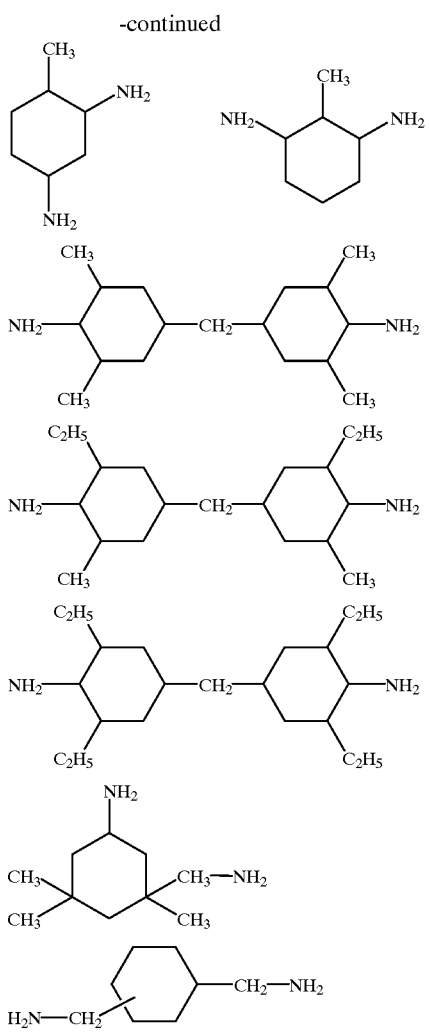

Ketones suitable for reaction with the diamines to form ketimines in accordance with the invention are those containing 3 to 8 and preferably 6 carbon atoms, such as, acetone, methyl ethyl ketone, methyl isobutyl ketone, diisopropyl ketone, cyclopentanone, and cyclohexanone.

Isocyanate crosslinking agents suitable for purposes of the present invention include hexamethylene diisocyanate, 1-methyl-2,4-diisocyanatocyclohexane, isophorone diisocyanate, 4,4,-diisocyanatocyclohexyl methane, toluene 2,4-diisocyanate, ortho-, meta-, and para-xylene diisocyanate, 1-5-napthylene diisocyanate, blocked isocyanates and mixtures thereof. Polyisocyanates with isocyanurate, alliphonate, or uretdione structures (dimers of polyisocyanates), are also suitable. Preferred for purposes of the present invention is the uretdione isocyanate. The crosslinking resin is present in an amount between 10 and 80 percent by weight, preferably 25 and 60 percent by weight, based on the total weight of the ketimine of acetone and the isocyanate crosslinker.

The coating composition may also contain a hydroxy functional polymeric resin. When used, the hydroxy functional resin is present in an amount up to 60% by weight, preferably up to 30% by weight, based on total coating composition weight. The hydroxy functional resin has at least one hydroxyl group in the polymeric backbone. The hydroxy functional resin has a composition which would have a sprayable solution viscosity at the solids required to transfer a suitable amount of material to the intended substrate. The hydroxy functional resin may comprise polymers selected from the group consisting of acrylic, polyester, alkyd/acrylic, and polyether polymers and mixtures thereof. Examples of commercially available hydroxy functional resins include: acrylic polyols sold under the trademark Joncryl® 500 from Johnson Wax, or AU608 from Rohm and Haas; polyester polyols include Desmophen® 650A-65, from Bayer and K-Flex® 188 from King Industries.

The coating composition may also include reactive diluents having a viscosity of 1000 cps or less at 100% non-volatile. The reactive diluents include at least one crosslinking site to allow them to become part of the crosslinked network structure in the coating system. Such reactive diluents include polyesters obtained by the reaction of two moles of butanediol with one mole of adipic acid, or the reaction product of 2 to 3 moles of epsilo-caprolactone with a diol such as butane diol or with a triol such as glycerine. Commercial products that include these types of polyesters are Lexorez® 1100-220 from Inolex Chemical, Tone® 201 and Tone® 301, from Union Carbide and Caspol 5001 series from Caschem. The diluents possess at least one reactive hydrogen to allow them to become crosslinked into the coating matrix.

The reactive diluent may be an amine reactive diluent, such as a secondary amine reactive diluent. Useful secondary amine reactive diluents require little or no solvent for reduction to spray viscosity. The preferred secondary amine reactive diluents are those having a viscosity of 1500 cps or less at 100% non-volatile content. One preferred secondary amine is the reaction product via nucleophilic addition of a primary diamine with two moles of a mono- unsaturated reactant. A material of this type for example, is a reaction product of one mole of 4,4'-methylenebis(2-methyl) cyclohexanamine with two moles of diethyl maleate. When included the reactive diluent is present in an amount between 2 and 40% by weight, based on total coating composition weight.

The coating composition may also contain pigments. These pigments can be introduced by first forming a mill base with a hydroxy functional resin or with other compatible polymers, by conventional techniques, such as sandgrinding, ball-milling, attritor grinding, or two roll milling to disperse the pigment. The mill base is blended with the film forming constituents according to methods known in the art.

Coating compositions described by the present invention are particulary useful in coatings that form films and cure at ambient temperatures. Examples of such coating compositions are those used as automotive refinish coatings. It is also suggested that the present invention applies to coatings to be baked or force dried to accelerate the curing process. Force drying conditions range from 100° F. (37.8° C.) to 190° F.(87.8° C.) . Baking conditions common in the art may range from 175° F. (79.4° C.) to over 325° F. (162.8° C.). The coating cure process for the present invention may also be accelerated by the utilization of radiant heating or Infra Red emitting devices known to the art.

The following examples are intended to illustrate the invention. All quantities are shown on a weight basis unless otherwise indicated.

EXAMPLES 1–4

Coating Compositions

| Ingredients | Examples | | | |
|---|---|---|---|---|
| | 1 | 2 | 3 | 4 |
| Diketimine | 50.0% | 50.0% | 0.0 | 0.0 |
| Diketimine/Acetate mixture (50/50)* | 0.0 | 0.0 | 100.0 | 0.0 |
| Diketimine/Butyl Acetate Mixture (50/50%)* | 0.0 | 0.0 | 0.0 | 100.0 |
| Acetone | 50.0 | 0.0 | 0.0 | 0.0 |
| n-Butyl acetate | 0.0 | 50.0 | 0.0 | 0.0 |

Solutions were made according to the above examples and allowed to stand for eight days.

To 100 grams of each of the above mixtures was added 62.2 grams of Uretdione polyisocyanate. The coating was sprayed on cold rolled steel panels, in three coats with three minute flash time.

Coating Compositions Viscosities:

| Example | 1 | 2 | 3 | 4 |
|---|---|---|---|---|
| Initial Viscosity | 11.4 | 12.8 | 11.8 | 13.0 |
| Viscosity at 2 hr. 30 min | 11.9 | 13.0 | 12.8 | 13.2 |
| Viscosity at 4 hr 45 min. | 12.0 | 13.4 | 13.0 | 13.8 |

Coating Composition Dry Film Thicknesses and Dry Times

| Example | 1 | 2 | 3 | 4 |
|---|---|---|---|---|
| Dry Film Thickness (mils) | 2.6 | 2.1 | 2.4 | 1.8 |
| Drytime-Dust Free (sec.) | 60 | 75 | 20 | 80 |
| Drytime-Tack free (sec.) | 105 | 135 | 75 | 165 |

*(from dry recorder)

We claim:

1. A method for preparing coating compositions of low volatile organic content comprising the steps of
   A. forming a ketimine of acetone by reacting
      i) acetone, and
      ii) a ketimine having the formula

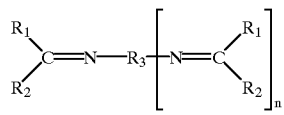

wherein n is 1 to 4,
   $R_1$ and $R_2$ are selected from the group consisting of alkyl, aryl, and cycloaliphatic groups, and mixtures thereof, where $R_1$ and $R_2$ may be the same or different, with the proviso that $R_1$ and $R_2$ are not both $CH_3$, and
   $R_3$ is selected from the group consisting of aliphatic, aromatic, arylaliphatic and cycloaliphatic groups which may also contain functionality selected from the group consisting of O, N, S and Si, wherein the ketimine and acetone are used in a mixture between 10 and 90 percent ketimine and between 90 and 10 percent acetone, where percentages are based on the total weight of the mixture, and B. subsequently reacting the ketimine of acetone with at least one isocyanate functional crosslinking resin selected from the group consisting of blocked and unblocked polyisocyanates, blocked and unblocked dimers of polyisocyanates, blocked and unblocked allophantes, and blocked and unblocked trimers of polyisocyanates, wherein the crosslinking resin is present in an amount between 20 and 60 percent by weight, based on the total weight of ketimine and crosslinking resin, and C. adding to the composition a hydroxy functional resin in an amount up to 60% by weight.

2. The method of claim 1 wherein the ketimine is present in an amount of 50% by weight and the acetone is present in an amount of 50% by weight based on total weight of the ketimine and acetone mixture.

3. The method of claim 1 wherein the mixture of acetone and ketimine is stored for at least 4 days prior to combining with the isocyanate crosslinker.

4. The method of claim 1 wherein the isocyanate functional crosslinking resin is selected from the group consisting of hexamethylene diisocyanate, 1-methyl-2,4-diisocyanatocyclohexane, isophorone diisocyanate, 4,4,-diisocyanatocyclohexyl methane, toluene 2,4-diisocyanate, ortho-, meta-, para-xylene diisocyanate, and 1-5-napthylene diisocyanate.

5. A method for forming a coating composition having low volatile organic content comprising
   A. forming a ketimine of acetone by reacting
      i) acetone, and
      ii) a ketimine having the formula

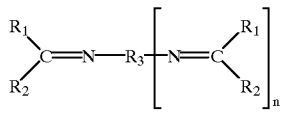

wherein n is 1 to 4,
   $R_1$ and $R_2$ are selected from the group consisting of alkyl, aryl, and cycloaliphatic groups, and mixtures, where $R_1$ and $R_2$ may be the same or different, with the proviso that $R_1$ and $R_2$ are not both $CH_3$, and
   $R_3$ is selected from the group consisting of aliphatic, aromatic, arylaliphatic and cycloaliphatic groups which may also contain functionality selected from the group consisting of O, N, S and Si,
   B. subsequently reacting the compound formed in A with at least one isocyanate functional crosslinking resin selected from the group consisting of blocked and unblocked polyisocyanates, blocked and unblocked dimers of polyisocyanates, blocked and unblocked allophantes, and blocked and unblocked trimers of polyisocyanates, and present in an amount between 40 and 80% by weight, based on total coating composition weight and

C. adding to the coating composition amine functional or hydroxy functional reactive diluent, and optionally, compounds selected from the group consisting of pigments, and hydroxy functional polymeric compounds.

6. The method of claim 5 wherein reactive diluent is added in an amount between 2 and 50% by weight based on total coating composition weight.

7. The method of claim 5 wherein hydroxy functional polymeric compound is added in an amount up to 60% by weight, based on total coating composition weight.

* * * * *